United States Patent Office 3,239,523
Patented Mar. 8, 1966

3,239,523
3-(4-DIALKYLAMINOALKOXYPHENYL) CINNOLINES
Harman S. Lowrie, 832 Rolling Pass, Glenview, Ill.
No Drawing. Filed May 6, 1965, Ser. No. 453,840
4 Claims. (Cl. 260—250)

The present invention relates to a group of 3-phenylcinnolines having a dialkylaminoalkoxy or similar substituent on the phenyl group. In particular, it relates to a group of compounds having the following general formula

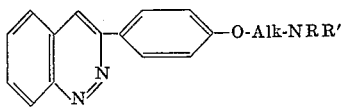

wherein Alk is a lower alkylene radical separating the atoms attached thereto by at least 2 carbon atoms; —NRR' is selected from the group consisting of di(lower alkyl-amino, 1-pyrrolidinyl, piperidino, and 4-methyl-1-piperazinyl. The cyclic amino groups referred to above can further contain up to two lower alkyl substituents attached to the ring through carbon atoms.

The lower alkylene radicals referred to above contain up to 6 carbon atoms and can be exemplified by ethylene, propylene, trimethylene, and similar divalent radicals. The lower alkyl radicals referred to above contain up to 6 carbon atoms and can be exemplified by methyl, ethyl, propyl, isopropyl, butyl, and the like.

The organic bases of this invention form pharmaceutically acceptable salts with a variety of inorganic and strong organic acids including sulfuric, phosphoric, hydrochloric, hydrobromic, sulfamic, citric, ascorbic and related acids.

The compounds of this invention are prepared from 3-(4-hydroxyphenyl)cinnoline. This is reacted with an appropriate dialkylaminoalkyl halide or similar compound in the presence of alkali to give the compounds of the present invention. The reaction is carried out in an inert solvent; 2-butanone has been found to be particularly useful for this purpose.

The compounds of the present invention are useful because of their pharmacological properties. Thus, they are anti-ulcer agents as demonstrated by their inhibition of ulceration in the Shay rat. They are also anti-inflammatory agents; this is demonstrated by a phenylbutazone-like effect on edematous conditions. The present compounds also possess antibiotic activity against a number of organisms; thus, they inhibit the growth of the protozoa *Tetrahymena gelleii* and the alga *Chlorella vulgaris*. They have also demonstrated activity as appetite inhibitors and central nervous system stimulants.

The following examples are presented to further illustrate the present invention; they should not be construed as limiting it in spirit or in scope. In these examples, quantities are indicated in parts by weight unless parts by volume are specified and temperatures in degrees centigrade (° C.). The relationship between parts by weight and parts by volume is the same as that between grams and milliliters.

Example 1

A mixture of 20 parts of 3-(4-methoxyphenyl)-cinnoline and 450 parts of 48% hydrobromic acid is refluxed for 2 hours. A solution is obtained at first but, after about 1 hour, red crystals begin to separate. At the completion of the heating the mixture is diluted to 2000 parts by volume with water and filtered. The solid separated in this way is dissolved in dilute potassium hydroxide solution and filtered. The filtrate is acidified and the resultant mixture is filtered to separate the solid; the solid is washed well with water. The yellow product obtained in this way is recrystallized from a mixture of methanol and benzene to give 3-(4-hydroxyphenyl)cinnoline melting at about 235–237° C.

Example 2

A mixture of 4.4 parts of 3-(4-hydroxyphenyl)cinnoline, 5.4 parts of 2-diethylaminoethyl chloride, 2.6 parts of powdered potassium hydroxide pellets, and 320 parts of 2-butanone is refluxed and stirred for 16 hours. The solvent is then evaporated from the solution under reduced pressure and the resultant residue is dissolved in ether. The ether solution is washed with dilute potassium hydroxide solution and then extracted with dilute hydrochloric acid. The acid extract is made alkaline; the alkaline mixture is extracted with ether and the resultant ether extract is dried, first by shaking with a saturated aqueous solution of sodium chloride and then by filtering through anhydrous potassium carbonate. The solvent is evaporated from the ether solution to leave a residue which is recrystallized from hexane. The product thus obtained, as shiny yellow plates, is 3-[4-(2-diethylaminoethoxy)phenyl]cinnoline melting at about 67–68° C. This compound has the following formula

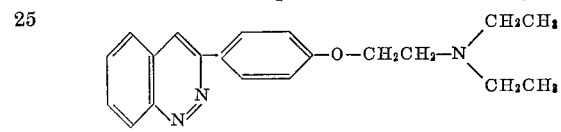

Example 3

Equivalent quantities of 2-dimethylaminoethyl chloride and 3-diethylaminopropyl chloride are substituted for the 2-diethylaminoethyl chloride and the procedure of Example 2 is repeated. The products obtained are, respectively, 3 - [4-(2-dimethylaminoethoxy)phenyl]cinnoline and 3 - [4 - (3-diethylaminopropoxy)phenyl]cinnoline.

Example 4

6.6 parts of 3-(4-hydroxyphenyl)cinnoline is reacted with 20 parts of 1-(2-chloroethyl)-2,5-dimethylpyrrolidine hydrochloride and 12.6 parts of potassium hydroxide pellets in 320 parts of 2-butanone according to the procedure described in Example 2. A reflux period of 18 hours is used in this instance. The product thus obtained as shiny yellow plates, is 3-{4-[2-(2,5-dimethyl-1-pyrrolidinyl)ethoxy]phenyl}cinnoline melting at about 102–103° C. This compound has the following formula

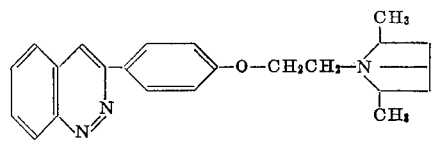

Example 5

The reaction of 3-(4-hydroxyphenyl)cinnoline with 1-(2-chloroethyl)piperidine, 1-(2-chloroethyl)pyrrolidine, and 1-(2-chloroethyl)-4-methylpiperazine according to the procedure described in Example 2 gives, respectively, 3 - [4-(2-piperidinoethoxy)phenyl]cinnoline, 3-{4-[2-(1-pyrrolidinyl)ethoxy]phenyl}cinnoline, and 3 - {4-[2-(4-methyl-1-piperazinyl)ethoxy]phenyl}cinnoline.

What is claimed is:
1. A compound of the formula

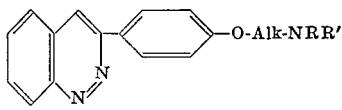

wherein Alk is lower alkylene separating the atoms attached thereto by at least 2 carbon atoms and —NRR' is selected from the group consisting of di(lower alkyl)-amino, 1-pyrrolidinyl, piperidino, 4-methyl-1-piperazinyl, and the aforesaid cyclic amines having up to two methyl substituents.

2. A compound of the formula

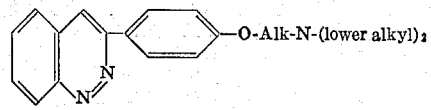

wherein Alk is lower alkylene separating the atoms attached thereto by at least 2 carbon atoms.

3. 3-[4-(2-dimethylaminoethoxy)phenyl]cinnoline.

4. 3 - {4 - [2 - (2,5 - dimethyl-1-pyrrolidinyl)ethoxy]phenyl}cinnoline.

No references cited

IRVING MARCUS, *Primary Examiner.*

UNITED STATES PATENT OFFICE
CERTIFICATE OF CORRECTION

Patent No. 3,239,523                        March 8, 1966

Harman S. Lowrie

It is hereby certified that error appears in the above numbered patent requiring correction and that the said Letters Patent should read as corrected below.

In the grant, line 3, after "Illinois," insert -- assignor to G. D. Searle & Co., of Chicago, Illinois, a corporation of Delaware, --; line 12, for "Harman S. Lowrie, his heirs" read -- G. D. Searle & Co., its successors --; in the heading to the printed specification, line 4, for "Harman S. Lowrie, 832 Rolling Pass, Glenview, Ill." read -- Harman S. Lowrie, Glenview, Ill., assignor to G. D. Searle & Co., Chicago, Ill., a corporation of Delaware --; column 1, line 21, for "alkylamino" read -- alkyl)amino --; line 64, for "3-(4-methoxyphenyl)-cin-" read -- 3-(4-methoxyphenyl)cin- --; column 2, lines 49 to 55, for that portion of the formula reading

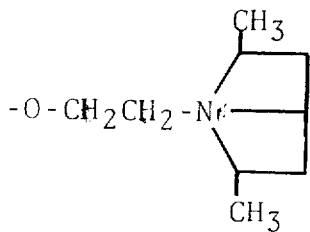  read  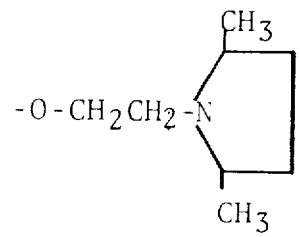

column 4, line 3, for "-(2-dimethylaminoethoxy)" read -- -(2-diethylaminoethoxy) --.

Signed and sealed this 24th day of January 1967.

(SEAL)
Attest:

ERNEST W. SWIDER                       EDWARD J. BRENNER
Attesting Officer                  Commissioner of Patents